United States Patent [19]

Weissgerber et al.

[11] Patent Number: 4,951,802
[45] Date of Patent: Aug. 28, 1990

[54] ASSEMBLY STATION, PARTICULARLY FOR WORKING ON AUTOMOTIVE VEHICLE BODIES

[75] Inventors: Folker Weissgerber; Hermann Kaspar, both of Wolfsburg, Fed. Rep. of Germany

[73] Assignee: Volkswagen Aktiengesellschaft, Wolfsburg, Fed. Rep. of Germany

[21] Appl. No.: 788,151

[22] Filed: Oct. 16, 1985

[30] Foreign Application Priority Data

Oct. 16, 1984 [DE] Fed. Rep. of Germany ....... 3437755

[51] Int. Cl.$^5$ ............................................. B65G 47/00
[52] U.S. Cl. .............................. 198/346.1; 198/465.1; 29/33 P
[58] Field of Search .................. 198/345, 346.1, 346.2, 198/341, 465.1, 465.2; 29/33 P, 563

[56] References Cited

U.S. PATENT DOCUMENTS

| | | | |
|---|---|---|---|
| 2,884,113 | 4/1959 | Converse et al. | 198/465.2 |
| 4,306,646 | 12/1981 | Magni | 198/341 |
| 4,444,303 | 4/1984 | Burgess | 198/465.1 |
| 4,473,935 | 10/1984 | Tatsuura et al. | 198/465.1 |
| 4,548,135 | 10/1985 | Kupczyk | 198/465.1 |

Primary Examiner—Joseph E. Valenza
Attorney, Agent, or Firm—Spencer & Frank

[57] ABSTRACT

An assembly line has an assembly station including tools installed in a work zone of the assembly station and a transporting device having a generally horizontal travel path passing through the assembly station. The transporting device carries a workpiece into and out of the assembly station along the travel path. The work zone and the tools are situated at a level above that of the travel path. A hoist is situated in the assembly station laterally of the travel path for lifting the workpiece into the work zone from the travel path and for lowering the workpiece from the work zone into the travel path.

3 Claims, 2 Drawing Sheets

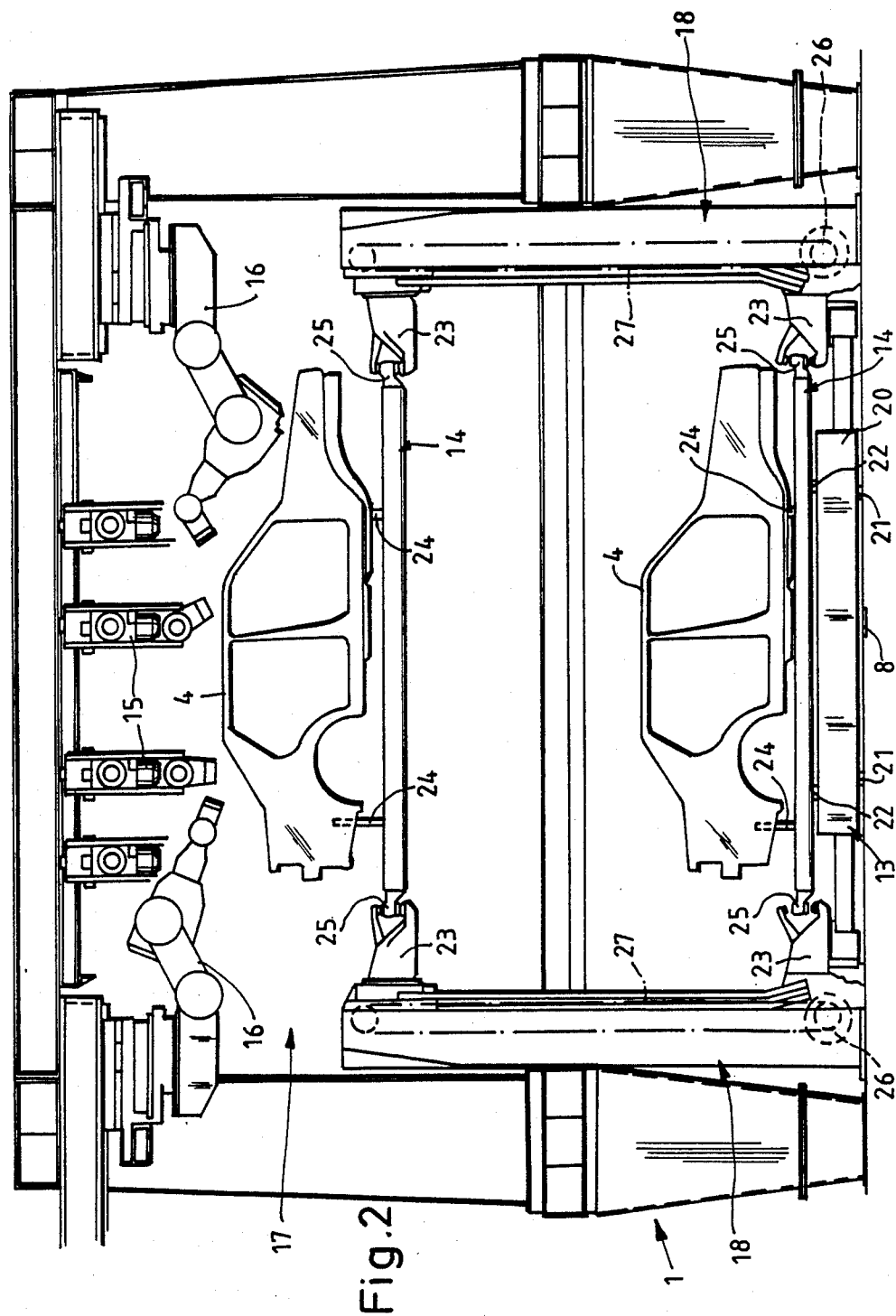

ASSEMBLY STATION, PARTICULARLY FOR WORKING ON AUTOMOTIVE VEHICLE BODIES

BACKGROUND OF THE INVENTION

This invention relates to an assembly station, particularly for automotive vehicle bodies. Transporting devices, such as transport frames or carts carry workpieces (which are to be worked on by tools in a work zone) to the assembly station and subsequently move the work-pieces out of the assembly station. The transporting devices have a travel path passing through the assembly station It is known to arrange, for example, components to be spot-welded to form a vehicle body, on transport frames or carriages which are displaceable along a travel path such that the components are subsequently aligned to assume a desired relative position with respect to one another and are, after performing correctional displacements by clamping devices, welded to one another. The transport frames receive travel commands, for example, by a cable which lies on the assembly floor and travel, without rails, into the working zone of the assembly station. The transport frames are stopped in the station while work o the work-pieces is performed and are subsequently moved out of the assembly station, for example, to a subsequent assembly station.

In known assembly stations of the above-outlined type, difficulties have been encountered in so arranging the required tools such as welding robots that they do not project into the travel path of the transport frames and the components supported thereon. In essence, for such a purpose, all tools have to be arranged on two opposite sides of the transport frame dwelling in the work zone of the assembly station because the other two opposite sides have to be maintained free lest they obstruct the travel path of the transport frame. In conventional assembly stations this problem may be cured in principle only by providing a greater number of assembly stations, each having only a relatively small number of tools which may be easily arranged. In the work zone on the two opposite sides of the transport frame, as related to its travel path. Such a solution, however, involves not only a substantial structural expense, but also needs a very large floor space.

SUMMARY OF THE INVENTION

It is an object of the invention to provide an improved assembly station of the above-outlined type wherein an interference of the tools situated in the work zone of the station with the travel path of the workpiece transport frame or carriage is eliminated without the need for a greater floor space for the assembly station or the assembly line as a whole.

This object and others to become apparent as the specification progresses, are accomplished by the invention, according to which, briefly stated, the work zone of the assembly station, together with the tools, is situated above the travel path of the transport frames or carriages and the assembly station has, laterally to the travel path, a hoisting arrangement for the components to be worked on.

Thus, according to the invention, the stated problem is resolved in a relatively simple manner by providing that the assembly plane, together with the tools, is situated above the travel path of the transport frames carrying the components to be worked on. Additional construction is required practically only in that a hoisting device has to be provided for lifting the cart or the transport frame, carrying the components, into the work zone and, subsequent to performing the work, for lowering the same back into the travel path. By virtue of locating the work zone at a higher level, it is possible to provide tools such as robots at all four sides of the frame and also perpendicularly above the travel path. At the height level of the travel path, space should be secured merely for accommodating the hoisting arrangement which, however, may be placed without difficulty at either side of the travel path of the transport frame dwelling in the assembly station

BRIEF DESCRIPTION OF THE DRAWING

FIG. 1 is a schematic perspective view of a preferred embodiment of the invention, while FIG. 2 is a front view of the assembly station.

DESCRIPTION OF THE PREFERRED EMBODIMENT

Figure 1:
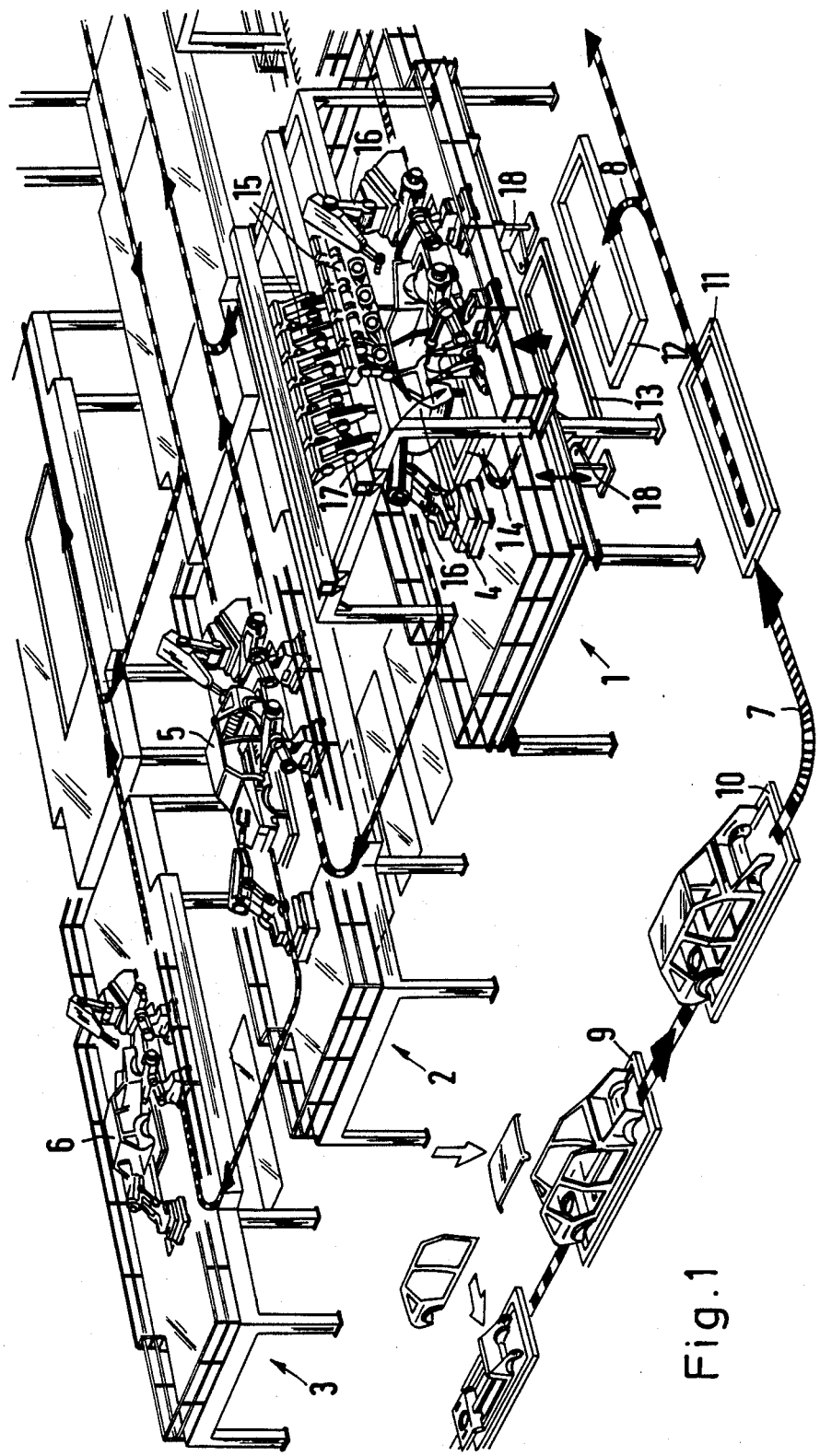

Turning now to FIG. 1, there are shown assembly stations 1, 2 and 3 which serve for assembling vehicle bodies 4, 5 and 6. The individual body components are moved into and out of the assembly stations by means of transport frames shown at 9, 10, 11, 12 and 13, travelling along travel paths 7 and 8. By means of additional frames, of which one is shown in the FIGURE and designated at 14, individual components which are to be assembled to subsequently constitute the vehicle body and which are, for example, side panels and transverse walls as well as roof are already placed such that they assume their final orientation. It is then only necessary to bring the components, in the assembly station 1, into their final position relative to one another by means of clamping devices such as suspended, programmed automatic handling devices 15 and to clamp them in the final position while, by means of welding robots 16, spot-welds are provided in such a number and arrangement that the individual body components are sufficiently bonded to one another for transport into the subsequent assembly station 2.

As shown in the FIGURE, the work zone 17, together with the tools 16 associated therewith is situated above the travel path 8. Thus, the vehicle body may be worked on from all four sides and also from above by the tools 16 (welding robots) without obstructing the travel of the transport frames along their travel path 8. Hoisting devices 18 (shown only in the assembly station 1) serve for lifting a partial frame 14 (carrying the body 4) from the transport frame 13 dwelling underneath the work zone 17 and for bringing it into the plane of the work zone. After completion of the work on the body 4 the latter is again lowered with the partial frame 14 onto the transport frame 13 and moved to the subsequent assembly station 2.

The transport frame 12 which too, is carrying vehicle body parts, waits in a standby position before the assembly station 1. Since in the shown embodiment the transport frames are moving into the stations in a direction transversely to their greatest length dimension, there are obtained (despite the noted standby position or other standby positions between the assembly stations 1, 2 and 3) particularly short lengths for the assembly line in that direction because at least some of the individual standby positions may be situated underneath the tools.

The hoists 18 may be so designed that instead of the partial frames they are capable of lifting the entire transport frame or transport carriage into the work zone.

In case of a temporarily pre-connected vehicle body it might be sufficient to lift and lower the body by itself, thus without any transport frame or auxiliary frame.

In FIG. 2 for the same parts the same references have been used.

Transport frame 13 comprises support frame 20 equipped with four wheels 21 the planes of which are perpendicular with respect to the drawing plate. Support frame 20 is further equipped with supports 22 suited for holding additional frame 14 in a prescribed position so that additional frame 14 can be grasped by the gripping devices 23 of the hoists 18 when transport frame 13 has reached his position between the hoists 18.

Additional frame 14 is equipped with bearings 24 suited for holding the parts to be assembled to vehicle body 4, for instance front and side walls, in a certain relationship to one another in which they are to be assembled. These bearings for instance may comprise fork-like structures the parts being hold in the prongs thereof.

FIG. 2 shows two positions of additional frame 14 and vehicle body 4. After being driven by transport frame 13 along travel path 8 in the position shown in the lower part of FIG. 2 between the hoists 18, arms 25 of additional frame 14 are positioned within the pincer-like gripping devices 23 which non by means of electric motors 26 and chain transmissions 27 are moved in their position shown in the upper part of the drawing. In this position further frame 14 is separated from transport frame 13 and holds the parts to be assembled within work zone 17.

It will be understood that the above description of the present invention is susceptible to various modifications, changes and adaptations, and the same are intended to be comprehended within the meaning and range of equivalents of the appended claims.

1. In a vehicle body assembly line having an assembly station including tools installed in a work zone of said assembly station; a transporting carriage arranged for advancing on a floor and having a generally horizontal travel path passing through said assembly station; said transporting carriage being arranged for carrying all vehicle body parts into the assembly station for being joined therein and for carrying joined vehicle body parts out of the assembly station along said travel path; the improvement wherein the work zone and said tools are situated at a level above that of said travel path; the improvement further comprising a hoist means situated in said assembly station laterally of said travel path for lifting the vehicle body parts to be joined together into said work zone from said travel path and for lowering the vehicle body parts joined together from said work zone into said travel path.

2. An assembly line as defined in claim 1, wherein said transporting carriage includes a removable partial transport frame arranged for supporting thereon pre-positioned vehicle body parts to be joined together; said hoist means being arranged for grasping said partial transport frame.

3. An assembly line as defined in claim 1, wherein said transporting carriage has a maximum horizontal dimension, and further wherein said travel path is oriented, within said assembly station, transversely to said maximum dimension.

* * * * *